United States Patent
Preijert et al.

(10) Patent No.: US 12,179,864 B2
(45) Date of Patent: Dec. 31, 2024

(54) STEERING ASSEMBLY FOR A VEHICLE

(71) Applicant: Volvo Truck Corporation, Gothenburg (SE)

(72) Inventors: Stefan Preijert, Gothenburg (SE); Anders Olsson, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 316 days.

(21) Appl. No.: 17/843,168

(22) Filed: Jun. 17, 2022

(65) Prior Publication Data
US 2022/0402546 A1 Dec. 22, 2022

(30) Foreign Application Priority Data
Jun. 18, 2021 (EP) .................................... 21180191

(51) Int. Cl.
*B62D 7/15* (2006.01)

(52) U.S. Cl.
CPC ........... *B62D 7/159* (2013.01); *B62D 7/1509* (2013.01); *B62D 7/1518* (2013.01)

(58) Field of Classification Search
CPC .... B62D 7/159; B62D 7/1509; B62D 7/1518; B62D 7/144; B62D 7/142; B62D 7/20; B62D 7/16
See application file for complete search history.

(56) References Cited

U.S. PATENT DOCUMENTS 3,198,541 A * 8/1965 Christenson ......... B62D 7/1509
                                                         180/409
3,305,041 A * 2/1967 Schramm ............... B62D 7/142
                                                         180/414
(Continued)

FOREIGN PATENT DOCUMENTS

DE     102018214473 A1    2/2020
EP        1826098 A2    8/2007

OTHER PUBLICATIONS

EP 1826098 A2 with English translation. Date filed Jan. 30, 2007. Date published Aug. 29, 2007. (Year: 2007).*
(Continued)

*Primary Examiner* — Calvin Cheung
(74) *Attorney, Agent, or Firm* — Withrow & Terranova, PLLC (57) ABSTRACT

A steering assembly for a vehicle comprising a first, a second, a third, and a fourth wheel, a first steering actuator comprising a first actuating member, and a second steering actuator comprising a second actuating member. The first actuating member is connected to each of the first wheel and the second wheel. The second actuating member is connected to each of the third wheel and the fourth wheel. The steering assembly comprises a connection arrangement. The first and second steering actuators are connected to each other via the connection arrangement such that the first actuating member and the second actuating member move independently of each other when a relative movement parameter is within a predetermined relative movement range and the connection arrangement transfers movement between the first actuating member and the second actuating member when the relative movement parameter is outside the predetermined relative movement range.

19 Claims, 4 Drawing Sheets

(56) References Cited

U.S. PATENT DOCUMENTS

| | | | | |
|---|---|---|---|---|
| 3,481,620 | A | 12/1969 | McCoy | |
| 4,042,255 | A * | 8/1977 | Drewek | B62D 13/06 |
| | | | | 280/445 |
| 4,709,935 | A * | 12/1987 | Takizawa | B62D 7/146 |
| | | | | 280/124.135 |
| 6,262,551 | B1 * | 7/2001 | Clark | G01M 17/06 |
| | | | | 318/587 |
| 2001/0032762 | A1 | 10/2001 | Weisgerber | |
| 2014/0209407 | A1 | 7/2014 | Di Giusto et al. | |

OTHER PUBLICATIONS

DE 102018214473 A1 with English translation. Date filed Aug. 27, 2018. Date published Feb. 27, 2020. (Year: 2020).*
Extended European Search Report for European Patent Application No. 22179511.5, mailed Nov. 10, 2022, 12 pages.
Extended European Search Report for European Patent Application No. 21180191.5, mailed Dec. 7, 2021, 11 pages.

* cited by examiner

STEERING ASSEMBLY FOR A VEHICLE

RELATED APPLICATIONS

The present application claims priority to European Patent Application No. 21180191.5, filed on Jun. 18, 2021, and entitled "STEERING ASSEMBLY FOR A VEHICLE," which is incorporated herein by reference in its entirety.

FIELD OF THE DISCLOSURE

The invention relates to a steering assembly for a vehicle. Moreover, the present invention relates to a vehicle.

The invention can be applied in heavy-duty vehicles, such as trucks, buses and construction equipment. Although the invention will be described with respect to a truck, the invention is not restricted to this particular vehicle, but may also be used in other vehicles such as working machines, cars or other types of vehicles.

BACKGROUND

A vehicle is generally equipped with one of more steering assemblies for controlling the steering angles of two or more wheels of a vehicle.

It would be desired to increase the versatility of a steering assembly for steering a vehicle such that the system could be adjusted to individual driving scenarios in a straightforward manner.

SUMMARY

An object of the invention is to provide a steering assembly for a vehicle for which the steering of wheels can be adjusted to different driving scenarios in a straightforward manner whilst keeping the costs of the steering assembly within a reasonable range.

The object is achieved by a steering assembly.

As such, a first aspect of the present invention relates to a steering assembly for a vehicle. The vehicle comprises a first, a second, a third and a fourth wheel. The steering assembly comprises a first steering actuator comprising a first actuating member and a second steering actuator comprising a second actuating member.

The first actuating member is connected to, and thereby is adapted to control the steering angle of, each one of the first wheel and the second wheel. The second actuating member is connected to, and thereby is adapted to control the steering angle of, each one of the third wheel and the fourth wheel.

The steering assembly comprises a connection arrangement. The first and second steering actuators are connected to each other via the connection arrangement such that:
 the connection arrangement allows that the first actuating member and the second actuating member move independently of each other when a relative movement parameter, indicative of an amount of relative movement between the first actuating member and the second actuating member, is within a predetermined relative movement range and
 the connection arrangement transfers movement between the first actuating member and the second actuating member when the relative movement parameter is outside the predetermined relative movement range.

A steering assembly according to the above implies that relative steering angles differences between e.g. the first and third wheel of a vehicle may be adjusted in dependence on a current or expected driving scenario instead of being fixed, for instance adjusted whilst assembling the vehicle hosting the steering assembly or at a service station. Moreover, since the steering assembly as presented above also comprises the connection arrangement, it is implied that each one of the first to the fourth wheel may be steered even if one of the first and second steering actuators would cease to function as expected. Thus, the steering assembly according to the above implies a versatility in terms of the possibility to adjust relative steering angles between steered wheels as well as to provide appropriate steering redundancy by virtue of the connection arrangement. Furthermore, owing to the fact that the above two characteristics, viz appropriate versatility and redundancy, can be obtained by a system comprising two steering assemblies, the two characteristics can be obtained in a cost efficient manner.

For the sake of completeness, it should be noted that the steering assembly need not necessarily determine the relative movement parameter. Instead, and as will be exemplified in the description, the connection arrangement may be a mechanical system having a play or the like that allows a relative movement between the actuating members as long as the relative movement is low, i.e. when the relative movement parameter is within a predetermined relative movement range.

As used herein, the expression "the connection arrangement allows that the first actuating member and the second actuating member move independently of each other" is intended to recite that the connection arrangement is such that it does not transfer any movement between the first actuating member and the second actuating member when the relative movement parameter is within the predetermined relative movement range.

Optionally, the predetermined relative movement range includes zero relative movement between the first actuating member and the second actuating member. As such, the predetermined relative movement range may relate to relatively small relative movements between the actuating members.

Optionally, the predetermined relative movement range corresponds to a predetermined steering angle difference range for a steering angle difference between a first steering angle of the first wheel and a third steering angle of the third wheel. The predetermined steering angle difference range is defined by a predetermined upper endpoint value and a predetermined lower endpoint value. As such, the predetermined relative movement range may be linked to a steering angle difference, thereby implying an appropriate reference for the predetermined relative movement range.

Optionally, the predetermined upper endpoint value is in the range of 0.5° to 5°, preferably in the range of 1° to 3°.

Optionally, the predetermined lower endpoint value is in the range of −5° to −0.5°, preferably in the range of −3° to −1°.

Optionally, the first steering actuator comprises a first pivotable shaft, connected to the first actuating member, and the second steering actuator comprises a second pivotable shaft, connected to the second actuating member. The connection arrangement comprises a first connection portion pivotally connected to the first pivotable shaft and a second connection portion pivotally connected to the second pivotable shaft. The above implementation implies that the connection arrangement may be implemented in a space efficient manner.

As used herein, the term "pivotally connected" may for instance relate to a connection being such that the first connection portion is connected to the first pivotable shaft in such a manner that when the first pivotable shaft pivots, the first connection portion also pivots. As non-limiting examples, the first connection portion and the first pivotable shaft may be rigidly connected to each other, alternatively the first connection portion and the first pivotable shaft may be connected via one or more elements, such as one or more gear wheels, for transferring a pivot movement from the first connection portion to the first pivotable shaft and vice versa. For the sake of completeness, it should be noted that the above exemplifying explanation of the term "pivotally connected" also applies to the above-mentioned feature of "a second connection portion pivotally connected to the second pivotable shaft".

Optionally, the connection arrangement comprises a gear arrangement adapted to change the pivot direction of the first connection portion relative to the first pivotable shaft or the pivot direction of the second connection portion relative to the second pivotable shaft. The gear arrangement implies that two similar, or even identical, steering assemblies may be used for the first and second steering assemblies and that any difference in the direction of rotation between the actuators may be accommodated by the gear arrangement.

Optionally, the connection arrangement comprises a pivot joint connecting the first connection portion and the second connection portion. The pivot joint is such that it allows a relative pivot movement between the first connection portion and the second connection portion when a relative pivot therebetween is within a predetermined relative pivot range and such that it transfers a pivot movement between the first connection portion and the second connection portion when the relative pivot therebetween is outside the predetermined relative pivot range. The pivot joint implies a cost and space efficient implementation in order to obtain the desired characteristics of the connection arrangement.

Optionally, the predetermined relative pivot range includes zero relative pivot between the first connection portion and the second connection portion. As such, the predetermined relative pivot range may relate to relatively small relative pivot movements between the connection portions.

Optionally, the vehicle has a longitudinal extension in a longitudinal direction being parallel to an intended direction of travel of the vehicle, the vehicle further having a transversal extension in a transversal direction being perpendicular to the longitudinal direction, the vehicle having a longitudinal centre line extending in the longitudinal direction and being located in the transversal centre of the vehicle, each one of the first and second wheels being located on one side, and each one of the third and fourth wheels being located on the opposite side, of the longitudinal centre line. As such, each steering actuator may control the steering angles of wheels being located on the same side of the vehicle. This implies appropriate possibilities to control the steering angles of the wheels in various conditions, e.g. when travelling straight ahead, in order to keep the energy consumption of the vehicle appropriately low.

Optionally, the vehicle has a longitudinal extension in a longitudinal direction being parallel to an intended direction of travel of the vehicle, the vehicle further having a transversal extension in a transversal direction being perpendicular to the longitudinal direction, the vehicle having a transversal centre line extending in the transversal direction and being located in the longitudinal centre of the vehicle, each one of the first and second wheels being located on one side, and each one of the third and fourth wheels being located on the opposite side, of the transversal centre line. This implies appropriate possibilities to control the steering angles of the wheels in various conditions, e.g. when turning.

Optionally, the first actuating member is a first pitman arm and the second actuating member is a second pitman arm.

Optionally, the first actuating member is connected to the first wheel via a first link rod and to the second wheel via a second link rod, the second actuating member being connected to the third wheel via a third link rod and to the fourth wheel via a fourth link rod. The use of link rods implies a space and cost efficient assembly for steering control.

Optionally, the first link rod is connected to a first steering arm of the first wheel, the second link rod is connected to a second steering arm of the second wheel, the third link rod is connected to a third steering arm of the third wheel and the fourth link rod is connected to a fourth steering arm of the fourth wheel.

Optionally, the steering assembly is adapted to control a first steering angle of the first wheel and a third steering angle of the third wheel such that a predetermined steering angle difference is obtained between the first steering angle and the third steering angle.

Optionally, the steering assembly is adapted to determine information indicative of a current driving condition of the vehicle and to determine the predetermined steering angle difference on the basis of the information indicative of the current driving condition. The above possibility implies that the predetermined steering angle difference can be adjusted in a versatile manner.

Optionally, the steering assembly is adapted to determine a load in each one of the first link rod, the second link rod, the third link rod and the fourth link rod and to determine the predetermined steering angle difference such that the combination of, preferably the sum of, the loads is equal to or below a predetermined load threshold value. The link rod loads may provide useful information when determining whether the steering angles of the wheels are appropriate in certain conditions, such as a driving condition in which the vehicle is driving straight ahead, since such loads may indicate whether or not any one of the wheels experiences undesired roll resistance that propagates to the link rods.

Optionally, the predetermined load threshold value is determined on the basis of at least an intended direction of travel of the vehicle, preferably also on the intended speed of the vehicle.

Optionally, the steering assembly comprises a steering control assembly, preferably the steering control assembly comprises a steering wheel.

Optionally, the steering control assembly is adapted to issue a first steering request signal to the first steering actuator, the first steering actuator being adapted to issue a second steering request signal to the second steering actuator.

Optionally, the steering control assembly is adapted to issue a first steering request signal to the first steering actuator and a second steering request signal to the second steering actuator.

A second aspect of the present invention relates to a vehicle comprising a steering assembly according to the first aspect of the present invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The invention will be described below for a vehicle in the form of a truck 10 such as the truck illustrated in FIG. 1. The truck 10 should be seen as an example of a vehicle which could comprise a steering assembly according to the present invention.

However, the present invention may be implemented in a plurality of different types of vehicles. Purely by way of example, the present invention could be implemented in a truck, a tractor, a car, a bus, a work machine such as a wheel loader or any other type of construction equipment.

Moreover, the vehicle 10 has a longitudinal extension in a longitudinal direction x being parallel to an intended direction of travel and a lateral extension in a lateral direction y being perpendicular to the longitudinal direction. Furthermore, as indicated in FIG. 1, the vehicle 10 also has a vertical extension in a vertical direction z and the lateral direction y is perpendicular to each one of the longitudinal direction x and the vertical direction z.

Figure 1:
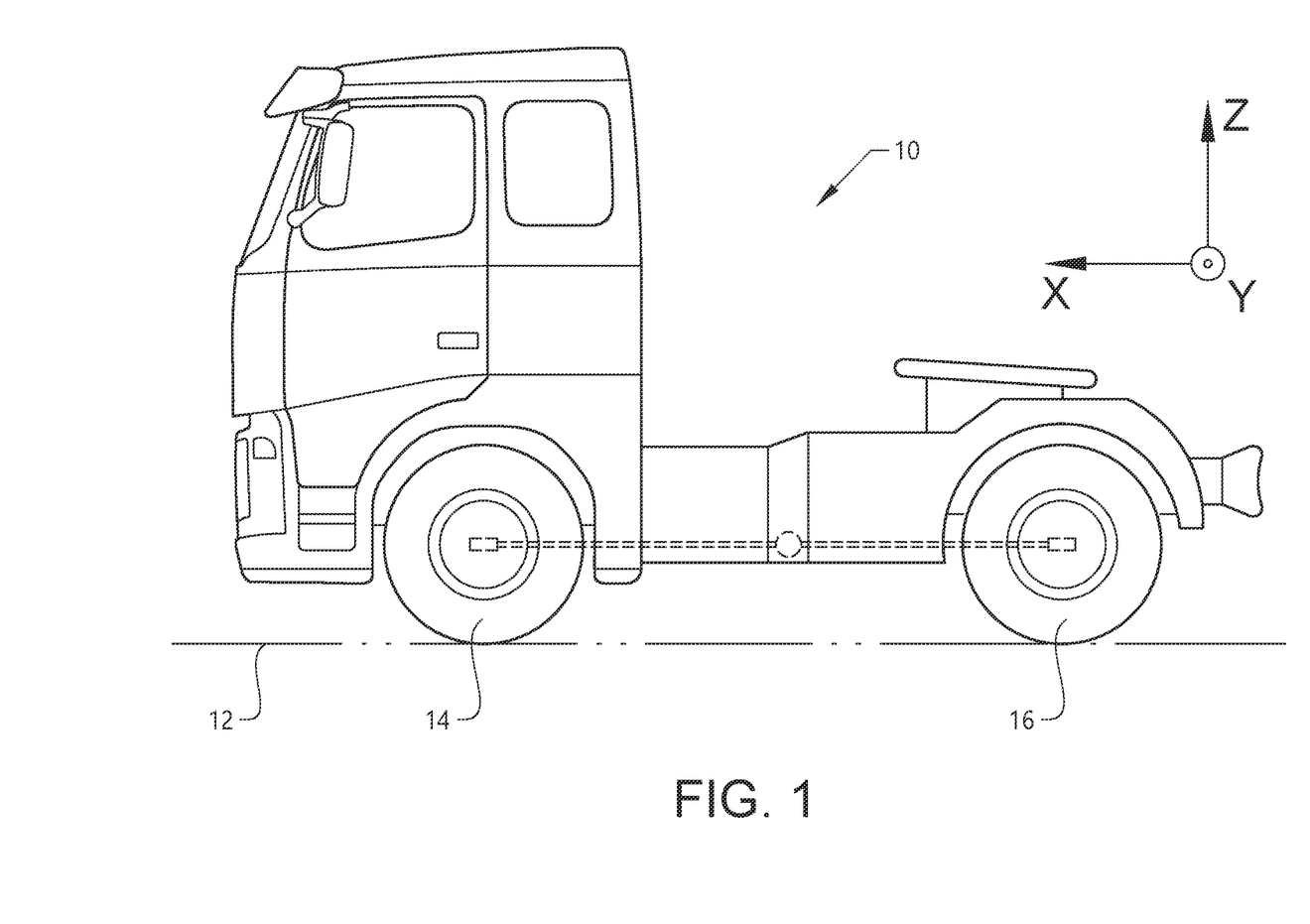
FIG. 1 schematically illustrates a vehicle.

A vehicle is generally adapted to be supported by a ground surface 12 and also generally comprises a plurality of wheels, which is exemplified in FIG. 1 by two wheels 14, 16. In order to control the steering of the vehicle 10, the vehicle 10 comprises a steering assembly (indicated by dashed lines in FIG. 1) in accordance with the present invention as will be presented hereinbelow with reference to FIG. 2a and FIG. 3, respectively.

Figure 2A:
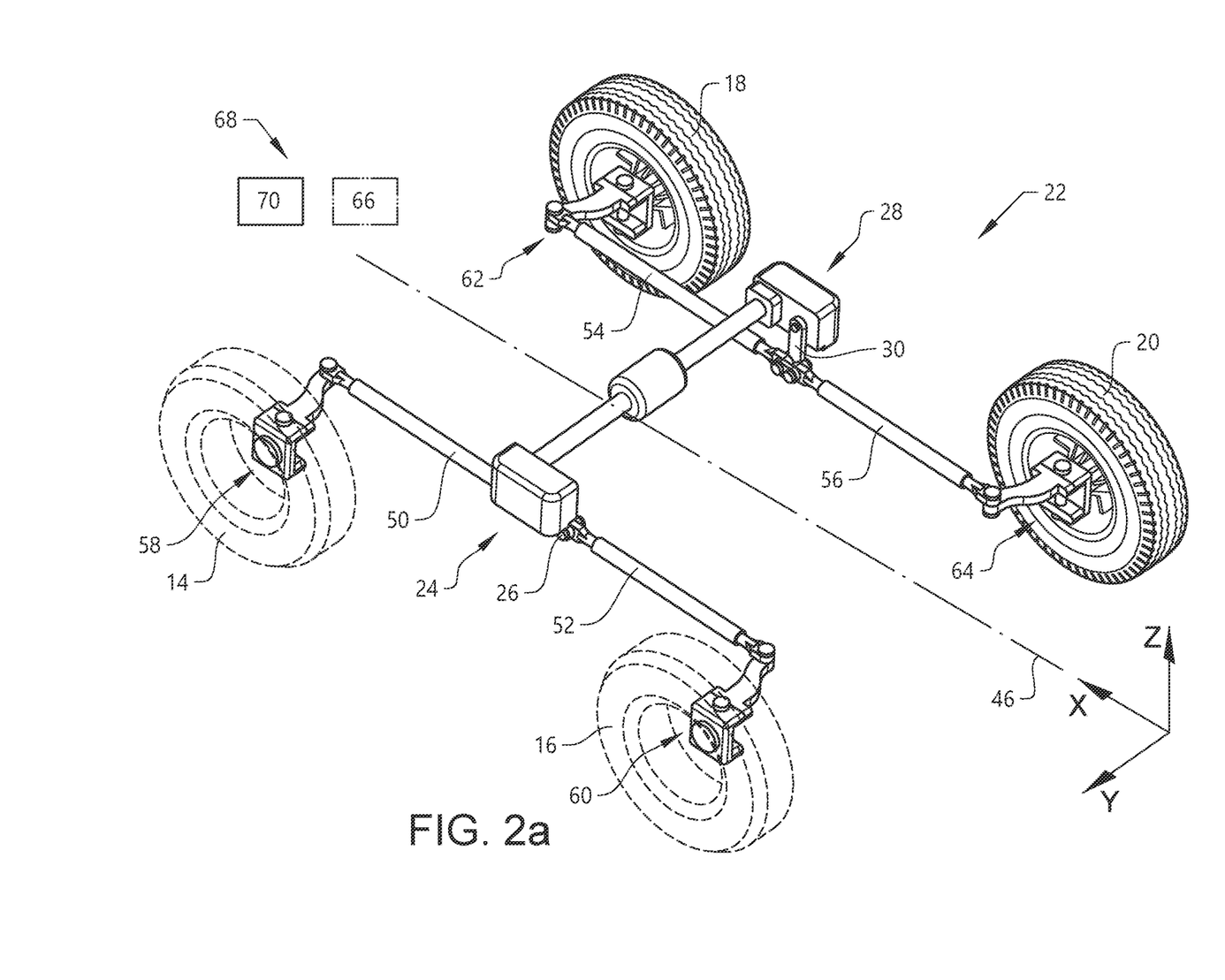
FIG. 2a schematically illustrates an embodiment of the steering assembly of the present invention.

As such, with reference to FIG. 2a, a first aspect of the present invention relates to a steering assembly 22 for a vehicle 10 (see FIG. 1). The vehicle comprises a first 14, a second 16, a third 18 and a fourth wheel 20. In an attempt to simplify FIG. 2a, the first and second wheels 14, 16 are indicated by dashed lines in FIG. 2a. It should be noted that embodiments of the vehicle may comprise more than four wheels. Furthermore, it is envisaged that embodiments of the steering assembly 22 may be adapted to steer more than four wheels.

The steering assembly comprises a first steering actuator 24 comprising a first actuating member 26 and a second steering actuator 28 comprising a second actuating member 30. In the embodiment illustrated in FIG. 2a, the first actuating member 26 is a first pitman arm and the second actuating member 30 is a second pitman arm.

The first actuating member 26 is connected to, and thereby is adapted to control the steering angle of, each one of the first wheel 14 and the second wheel 16 (see FIG. 1). The second actuating member 30 is connected to, and thereby is adapted to control the steering angle of, each one of the third wheel 18 and the fourth wheel 20.

Figure 2B:
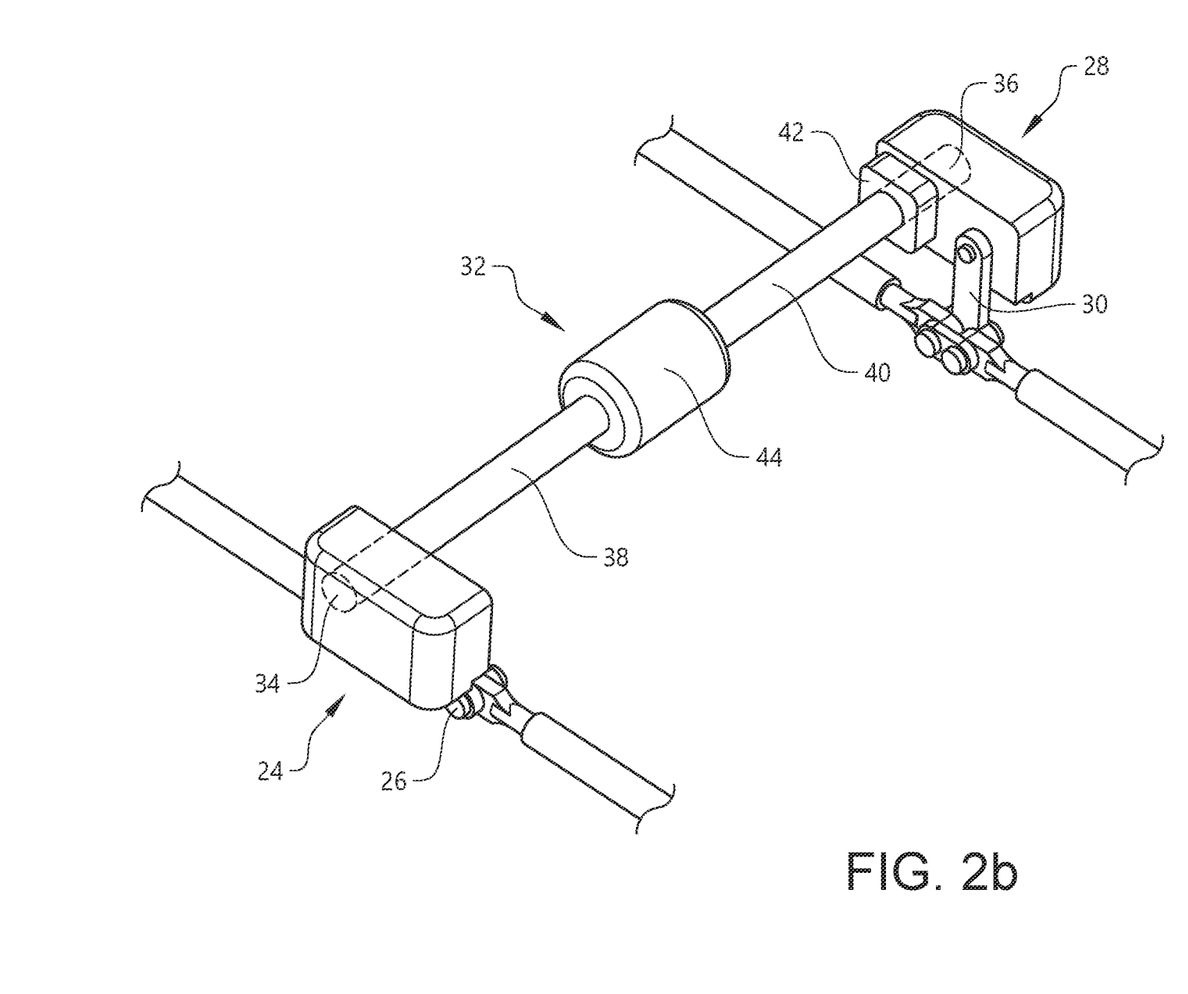
FIG. 2b illustrates a portion of the FIG. 2a embodiment.

The steering assembly comprises a connection arrangement 32, see FIG. 2b. The first and second steering actuators 24, 28 are connected to each other via a connection arrangement 32 such that:

the connection arrangement 32 allows that the first actuating member 26 and the second actuating member 30 move independently of each other when a relative movement parameter, indicative of an amount of relative movement between the first actuating member 26 and the second actuating member 30, is within a predetermined relative movement range and the connection arrangement 32 transfers movement between the first actuating member 26 and the second actuating member 30 when the relative movement parameter is outside the predetermined relative movement range.

Purely by way of example, the predetermined relative movement range may include zero relative movement between the first actuating member 26 and the second actuating member 30. As such, the range may be formulated in accordance with the following [−b, a] or (−b,a) wherein each one of the parameters a and b, respectively, represents a positive value indicative of a relative movement between the first actuating member 26 and the second actuating member 30. Moreover, as indicated above, the predetermined relative movement range may for instance be a closed range, thus including the end points of the range, or an open range, consequently not including the end points. As such, if the relative movement parameter is denoted r, the closed range [−b, a] includes the following values for r: −b≤r≤a. In a similar vein, the open range (−b, a) includes the following values for r: −b<r<a. It is of course also contemplated that in embodiments of the present invention, the predetermined relative movement range may be open in one range end and closed in the other.

As a non-limiting example, the predetermined relative movement range may correspond to a predetermined steering angle difference range [$\Delta\varphi_{lower}$, $\Delta\varphi_{upper}$] for a steering angle difference $\Delta\varphi$ between a first steering angle $\varphi_1$ of the first wheel 14 and a third steering angle $\varphi_3$ of the third wheel 18. The predetermined steering angle difference range [$\Delta\varphi_{lower}$, $\Delta\varphi_{upper}$] is defined by a predetermined upper endpoint value $\Delta\varphi_{upper}$ and a predetermined lower endpoint value $\Delta\varphi_{lower}$. In a similar vein as for the predetermined relative movement range, the predetermined steering angle difference range [$\Delta\varphi_{lower}$, $\Delta\varphi_{upper}$] may be open in one range end and closed in the other, closed in both range ends or open in both range ends.

As such, irrespective of the implementation of the connection arrangement 32, the connection arrangement may be such that it allows the first actuating member 26 and the second actuating member 30 to move independently of each other when the steering angle difference $\Delta\varphi$ between the first steering angle $\varphi_1$ and the third steering angle $\varphi_3$ is within the predetermined steering angle difference range [$\Delta\varphi_{lower}$, $\Delta\varphi_{upper}$].

Thus, though purely by way of example, the connection arrangement 32 may be such that the predetermined relative movement range is selected with respect to a predetermined steering angle difference range [$\Delta\varphi_{lower}$, $\Delta\varphi_{upper}$].

As a non-limiting example, the predetermined upper endpoint value $\Delta\varphi_{upper}$ may be in the range of 0.5° to 5°, preferably in the range of 1° to 3°.

Purely by way of example, the predetermined lower endpoint value $\Delta\varphi_{lower}$ may in the range of −5° to −0.5°, preferably in the range of −3° to −1°.

FIG. 2b illustrates a portion of the FIG. 2a steering assembly. As may be gleaned from FIG. 2a, the first steering actuator 24 comprises a first pivotable shaft 34, connected to the first actuating member 26, and the second steering actuator comprises a second pivotable shaft 36, connected to the second actuating member 30. The connection arrangement 32 comprises a first connection portion 38 pivotally connected to the first pivotable shaft 34 and a second connection portion 40 pivotally connected to the second pivotable shaft 36.

Furthermore, though purely by way of example, the connection arrangement 32 may comprise a gear arrangement 42 adapted to change the pivot direction of the first connection portion 38 relative to the first pivotable shaft 34 or the pivot direction of the second connection portion 40 relative to the second pivotable shaft 36. In the FIG. 2b embodiment, the gear arrangement 42 is adapted to change the pivot direction of the second connection portion 40 relative to the second pivotable shaft 36.

Additionally, again with reference to FIG. 2b, the connection arrangement 32 may comprise a pivot joint 44 connecting the first connection portion 38 and the second connection portion 40. Purely by way of example, the pivot joint 44 may be such that it allows a relative pivot movement between the first connection portion and the second connection portion when a relative pivot therebetween is within a predetermined relative pivot range and such that it transfers a pivot movement between the first connection portion and the second connection portion when the relative pivot therebetween is outside the predetermined relative pivot range. As a non-limiting example, the predetermined relative pivot range may include zero relative pivot between the first connection portion and the second connection portion.

Moreover, though purely by way of example, the pivot joint 44 may have one or more pivot joint abutment surfaces (not shown) which may be located at a circumferential distance from each other. Further, though again purely by way of example, the first connection portion 38 may have a first connection portion abutment surface (not shown) and the second connection portion 40 may have a second connection portion abutment surface (not shown). The abutment surfaces may be such that the first connection portion abutment surface abuts a pivot joint abutment surface and the second connection portion abutment surface abuts a (possibly a second) pivot joint abutment surface when the relative pivot between the first connection portion and the second connection portion is outside the predetermined relative pivot range.

As a non-limiting example, the abutment surfaces may be such that the predetermined relative movement range corresponds to the above-mentioned predetermined steering angle difference range [Δφlower, Δφupper]. Thus, using information indicative of the mechanical connection from the first wheel 14 to the first connection portion 38 as well as the mechanical connection from the third wheel 18 to the second connection portion 40, it is possible to implement the abutment surfaces such that the that the predetermined relative movement range corresponds to the above-mentioned predetermined steering angle difference range [Δφlower, Δφupper]. Although the implementation of the connection arrangement 32 presented above comprises a pivot joint, it is also envisaged that the connection arrangement 32 may be implemented differently in other embodiments of the present invention. Purely by way of example, it is contemplated that an implementation of the connection arrangement 32 may comprise a steering link (not shown in FIG. 2a) connecting the first and second steering actuators 26, 30 to each other. Purely by way of example, such an implementation of the connection arrangement 32 may have a free play allowing the first and second steering actuators 26, 30 to move independently of each when a relative movement parameter, indicative of an amount of relative movement between the first actuating member and the second actuating member, is within a predetermined relative movement range. Moreover, once the free play has been passed, the steering link (not shown in FIG. 2a) may act as a rigid linkage and thus transfer movement between the first actuating member 26 and the second actuating member 30, i.e. when the relative movement parameter is outside the predetermined relative movement range.

Again, though purely by way of example, the free play may be such that the predetermined relative movement range corresponds to the above-mentioned predetermined steering angle difference range [Δφlower, Δφupper]. Thus, using information indicative of the mechanical connection from the first wheel 14 to the first steering actuator 26 as well as the mechanical connection from the third wheel 18 to the second steering actuators 30, it is possible to implement the free play such that the predetermined relative movement range corresponds to the above-mentioned predetermined steering angle difference range [Δφlower, Δφupper].

With reference to FIG. 2a, and as has been intimated above with reference to FIG. 1, the vehicle 10 (see FIG. 1) has a longitudinal extension in a longitudinal direction x being parallel to an intended direction of travel of the vehicle. The vehicle further has a transversal extension in a transversal direction y being perpendicular to the longitudinal direction x. Furthermore, as indicated in FIG. 2a, the vehicle may have a longitudinal centre line 46 extending in the longitudinal direction x and being located in the transversal centre of the vehicle. Further, each one of the first and second wheels 14, 16 is located on one side, and each one of the third and fourth wheels 18, 20 is located on the opposite side, of the longitudinal centre line 46.

Going back to FIG. 2a, though purely by way of example, the first actuating member 26 may be connected to the first wheel 14 via a first link rod 50 and to the second wheel 16 via a second link rod 52. Further, again with reference to FIG. 2a and only serving as an example, the second actuating member 30 may be connected to the third wheel 18 via a third link rod 54 and to the fourth wheel 20 via a fourth link rod 56.

As a non-limiting example, the first link rod 52 may be connected to a first steering arm 58 of the first wheel 14, the second link rod 52 may be connected to a second steering arm 60 of the second wheel 16, the third link rod 54 may be connected to a third steering arm 62 of the third wheel 18 and the fourth link rod 56 may be connected to a fourth steering arm 64 of the fourth wheel 20.

In the FIG. 2a embodiment, each link rod 52, 54, 56, 58 is directly connected to one of the first and second actuating members 26, 30. However, as will be elucidated hereinbelow, a link rod 52, 54, 56, 58 may also be indirectly connected to one of the first and second actuating members 26, 30.

Figure 3:
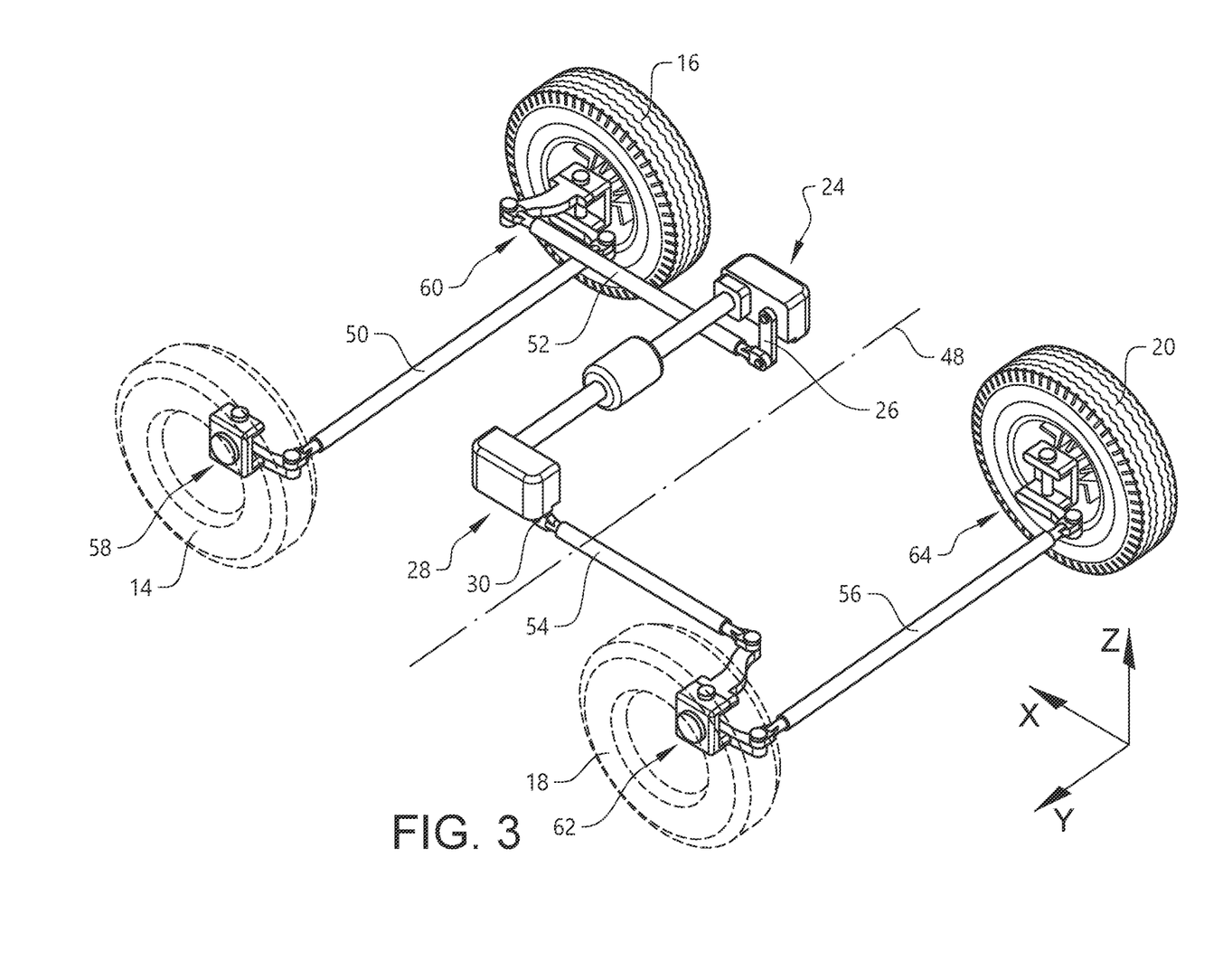
FIG. 3 schematically illustrates another embodiment of the steering assembly of the present invention.

FIG. 3 illustrates another embodiment of the present invention in which the vehicle has a transversal centre line 48 extending in the transversal direction and being located in the longitudinal centre of the vehicle (see FIG. 1). Each one of the first 14 and second 16 wheels is located on one side, and each one of the third 18 and fourth 20 wheels is located on the opposite side, of the transversal centre line 48.

Furthermore, in the FIG. 3 embodiment, the first link rod 50 is connected to the first steering arm 58 of the first wheel 14 and to the second steering arm 60 of the second wheel 16. Moreover, in FIG. 3, the second link rod 52 may connect the second steering arm 60 of the second wheel 16 to the first actuating member 26. As such, in the FIG. 3 embodiment, the first link rod 50 is indirectly connected to the first actuating member 26. In a similar vein, in the FIG. 3 embodiment, the fourth link rod 56 is connected to the fourth steering arm 64 of the fourth wheel 20 and to the third steering arm 62 of the third wheel 18. Moreover, in FIG. 3, the third link rod 54 may connect the third steering arm 62 of the third wheel 18 to the second actuating member 30. As such, in the FIG. 3 embodiment, the fourth link rod 56 is indirectly connected to the second actuating member 30.

Purely by way of example, the steering assembly 22 may be adapted to control a first steering angle of the first wheel 14 (see FIG. 1) and a third steering angle of the third wheel 18 such that a predetermined steering angle difference is obtained between the first steering angle and the third steering angle. To this end, though purely by way of example, the steering assembly 22 may be adapted to determine information indicative of a current driving condition of the vehicle and to determine the predetermined steering angle difference on the basis of the information indicative of the current driving condition. For instance, the steering assembly 22 may comprise a control unit 66, such as an electronic control unit, that is adapted to the above-mentioned predetermined steering angle difference on the basis of the information indicative of the current driving condition.

As a non-limiting example, the steering assembly may be adapted to determine a load in each one of the first link rod 50, the second link rod 52, the third link rod 54 and the fourth link rod 56 and to determine the predetermined steering angle difference such that the combination of, preferably the sum of, the loads is equal to or below a predetermined load threshold value. Thus, in example embodiments of the steering assembly 22, the control unit 66 may be adapted to receive signals indicative of the load in each one of the link rods and to adjust the steering angle for each wheel until the combination of the link rod loads is equal to or below a predetermined load threshold value. As such, the vehicle hosting the steering assembly or the steering assembly as such may comprise one or more load sensors (not shown) adapted to measure the loads in each one of the link rods 52, 54, 56, 58.

Purely by way of example, the predetermined load threshold value may be determined on the basis of at least an intended direction of travel of the vehicle, preferably also on the intended speed of the vehicle. As another non-limiting example, the predetermined load threshold value may be determined on the basis of at least an actual direction of travel of the vehicle, preferably also on an actual speed of the vehicle.

Moreover, as indicated in FIG. 2a, the steering assembly 22 may further comprise a steering control assembly 68. In the FIG. 2a embodiment, the steering control assembly 68 comprises a steering wheel 70. As a non-limiting example, the steering control assembly 68 may further comprise the control unit 66.

Optionally, the steering control assembly 68 is adapted to issue a first steering request signal to the first steering actuator 24. Purely by way of example, when the steering control assembly 68 comprises the control unit 66, the control unit 66 may be adapted to issue the first steering request signal to the first steering actuator 24. Moreover, though purely by way of example, the first steering actuator 24 may be adapted to issue a second steering request signal to the second steering actuator 28. As such, in embodiments of the steering assembly 22, the first steering actuator 24 may act as a master actuator and the second steering actuator may act as a slave actuator.

As an alternative to the above configuration, the steering control assembly 68, for instance using the control unit 66, may be adapted to issue a first steering request signal to the first steering actuator 24 and a second steering request signal to the second steering actuator 28.

It is to be understood that the present invention is not limited to the embodiments described above and illustrated in the drawings; rather, the skilled person will recognize that many changes and modifications may be made within the scope of the appended claims.

The invention claimed is:

1. A steering assembly for a vehicle comprising:
   a first steering actuator comprising a first actuating member,
   a second steering actuator comprising a second actuating member,
   the first actuating member being connected to and adapted to control the steering angle of each of a first wheel and a second wheel of the vehicle,
   the second actuating member being connected to and adapted to control the steering angle of each of a third wheel and a fourth wheel of the vehicle, and
   a connection arrangement, wherein the first and the second steering actuators are connected to each other via the connection arrangement such that:
   the connection arrangement allows the first actuating member and the second actuating member to move independently of each other when a relative movement parameter is within a predetermined relative movement range, the relative movement parameter being indicative of an amount of relative movement between the first actuating member and the second actuating member, and
   the connection arrangement transfers movement between the first actuating member and the second actuating member when the relative movement parameter is outside the predetermined relative movement range.

2. The steering assembly of claim 1, wherein the predetermined relative movement range includes zero relative movement between the first actuating member and the second actuating member.

3. The steering assembly of claim 1, wherein the predetermined relative movement range corresponds to a predetermined steering angle difference range ($[\Delta\varphi_{lower}, \Delta\varphi_{upper}]$) for a steering angle difference ($\Delta\varphi$) between a first steering angle ($\varphi_1$) of the first wheel and a third steering angle ($\varphi_3$) of the third wheel, the predetermined steering angle difference range ($[\Delta\varphi_{lower}, \Delta\varphi_{upper}]$) being defined by a predetermined upper endpoint value ($\Delta\varphi_{upper}$) and a predetermined lower endpoint value ($\Delta\varphi_{lower}$).

4. The steering assembly of claim 3, wherein the predetermined upper endpoint value ($\Delta\varphi_{upper}$) is in the range of 0.5° to 5°, preferably in the range of 1° to 3°.

5. The steering assembly of claim 3, wherein the predetermined lower endpoint value ($\Delta\varphi_{lower}$) is in the range of −5° to −0.5°.

6. The steering assembly of claim 1, wherein:
   the first steering actuator comprises a first pivotable shaft connected to the first actuating member,
   the second steering actuator comprises a second pivotable shaft connected to the second actuating member, and
   the connection arrangement comprises a first connection portion pivotally connected to the first pivotable shaft and a second connection portion pivotally connected to the second pivotable shaft.

7. The steering assembly of claim 6, wherein the connection arrangement comprises a gear arrangement adapted to change a pivot direction of the first connection portion relative to the first pivotable shaft or a pivot direction of the second connection portion relative to the second pivotable shaft.

8. The steering assembly of claim 6, wherein the connection arrangement comprises a pivot joint connecting the first connection portion and the second connection portion, the pivot joint allowing a relative pivot movement between the first connection portion and the second connection portion when a relative pivot therebetween is within a predetermined relative pivot range, and the pivot joint transferring a pivot movement between the first connection portion and the second connection portion when the relative pivot therebetween is outside the predetermined relative pivot range.

9. The steering assembly of claim 8, wherein the predetermined relative pivot range includes zero relative pivot between the first connection portion and the second connection portion.

10. The steering assembly of claim 1, wherein the first actuating member is a first pitman arm and the second actuating member is a second pitman arm.

11. The steering assembly of claim 1, wherein:
the first actuating member is connected to the first wheel via a first link rod and to the second wheel via a second link rod,
the second actuating member is connected to the third wheel via a third link rod and to the fourth wheel via a fourth link rod, and
the first link rod is connected to a first steering arm of the first wheel, the second link rod is connected to a second steering arm of the second wheel, the third link rod is connected to a third steering arm of the third wheel, and the fourth link rod is connected to a fourth steering arm of the fourth wheel.

12. The steering assembly of claim 11, wherein:
the steering assembly is adapted to determine a load in each one of the first link rod, the second link rod, the third link rod, and the fourth link rod and to determine a predetermined steering angle difference such that a combination of the loads is equal to or below a predetermined load threshold value, and
the predetermined load threshold value is determined on the basis of one or more of: an intended direction of travel of the vehicle, an intended speed of the vehicle, and any combination thereof.

13. The steering assembly of claim 1, wherein:
the steering assembly is adapted to control a first steering angle of the first wheel and a third steering angle of the third wheel such that a predetermined steering angle difference is obtained between the first steering angle and the third steering angle, and
the steering assembly is adapted to determine information indicative of a current driving condition of the vehicle and to determine the predetermined steering angle difference on the basis of the information indicative of the current driving condition.

14. The steering assembly of claim 1, wherein:
the steering assembly comprises a steering control assembly, and
the steering control assembly comprises a steering wheel.

15. The steering assembly of claim 14, wherein the steering control assembly is adapted to issue a first steering request signal to the first steering actuator, the first steering actuator being adapted to issue a second steering request signal to the second steering actuator.

16. The steering assembly of claim 14, wherein the steering control assembly is adapted to issue a first steering request signal to the first steering actuator and a second steering request signal to the second steering actuator.

17. A vehicle comprising
a first wheel, a second wheel, a third wheel, and a fourth wheel; and
a steering assembly comprising:
a first steering actuator comprising a first actuating member,
a second steering actuator comprising a second actuating member,
the first actuating member being connected to and adapted to control the steering angle of each of the first wheel and the second wheel,
the second actuating member being connected to and adapted to control the steering angle of each of the third wheel and the fourth wheel, and
a connection arrangement, wherein the first and the second steering actuators are connected to each other via the connection arrangement such that:
the connection arrangement allows the first actuating member and the second actuating member to move independently of each other when a relative movement parameter is within a predetermined relative movement range, the relative movement parameter being indicative of an amount of relative movement between the first actuating member and the second actuating member, and
the connection arrangement transfers movement between the first actuating member and the second actuating member when the relative movement parameter is outside the predetermined relative movement range.

18. The vehicle of claim 17, wherein the vehicle has a longitudinal extension in a longitudinal direction parallel to an intended direction of travel of the vehicle, the vehicle further having a transversal extension in a transversal direction perpendicular to the longitudinal direction, and
wherein the vehicle has a longitudinal centre line extending in the longitudinal direction and located in the transversal centre of the vehicle, each one of the first and the second wheels being located on one side of the longitudinal centre line, and each one of the third and the fourth wheels being located on an opposite side of the longitudinal centre line.

19. The vehicle of claim 17, wherein the vehicle has a longitudinal extension in a longitudinal direction parallel to an intended direction of travel of the vehicle, the vehicle further having a transversal extension in a transversal direction perpendicular to the longitudinal direction,
wherein the vehicle has a transversal centre line extending in the transversal direction and located in the longitudinal centre of the vehicle, each one of the first and the second wheels being located on one side of the transversal centre line, and each one of the third and the fourth wheels being located on an opposite side of the transversal centre line.

\* \* \* \* \*